United States Patent
Skau (10) Patent No.: US 10,150,076 B2
(45) Date of Patent: Dec. 11, 2018

(54) HONEYCOMB MONOLITH STRUCTURE

(71) Applicant: YARA INTERNATIONAL ASA, Oslo (NO)

(72) Inventor: Karl Isak Skau, Larvik (NO)

(73) Assignee: YARA INTERNATIONAL ASA, Oslo (NO)

( * ) Notice: Subject to any disclaimer, the term of this patent is extended or adjusted under 35 U.S.C. 154(b) by 75 days.

(21) Appl. No.: 15/323,817

(22) PCT Filed: Jul. 22, 2015

(86) PCT No.: PCT/EP2015/066734
§ 371 (c)(1),
(2) Date: Jan. 4, 2017

(87) PCT Pub. No.: WO2016/012490
PCT Pub. Date: Jan. 28, 2016

(65) Prior Publication Data
US 2017/0157548 A1    Jun. 8, 2017

(30) Foreign Application Priority Data

Jul. 23, 2014    (NO) .................................. 20140934

(51) Int. Cl.
*B01D 46/24*    (2006.01)
*F01N 3/28*    (2006.01)
(Continued)

(52) U.S. Cl.
CPC ....... *B01D 46/247* (2013.01); *B01D 46/2474* (2013.01); *B01D 53/9418* (2013.01);
(Continued)

(58) Field of Classification Search
None
See application file for complete search history.

(56) References Cited

U.S. PATENT DOCUMENTS 3,502,596 A    3/1970    Sowards
4,863,895 A    9/1989    Behr
(Continued)

FOREIGN PATENT DOCUMENTS

CN    201815314    5/2011
CN    203228304    10/2013
(Continued)

OTHER PUBLICATIONS

English translation of Office Action dated May 14, 2018 in Korean Application No. 10-2017-7005068.
(Continued)

*Primary Examiner* — Walter D. Griffin
*Assistant Examiner* — Jelitza M Perez
(74) *Attorney, Agent, or Firm* — Wenderoth, Lind & Ponack, L.L.P.

(57) ABSTRACT

Honeycomb monolith structure, especially for use as catalyst or support for a catalyst in selective catalytic reduction (SCR) of nitrogen oxides, comprising: a plurality of cell walls defining a plurality of polygonal channels, the plurality of cell walls and channels extending in parallel along a common direction from an entrance end to an outlet end of the structure in the fluid flow direction. The transversal cross section of a polygonal channel has the shape of a convex polygon in closest packing, wherein more than 50% of the internal angels between two adjacent walls of the convex polygon are above 90 degrees and wherein the cell aspect ratio $L_L/L_S$ is greater than 1.5. The monolith structure has an outer row of polygons in shifted direction perpendicular to each other at the two side edges of the monolith which are parallel to the longest direction of the cells/channels.

18 Claims, 5 Drawing Sheets

(51) Int. Cl.
  *B01D 53/94*  (2006.01)
  *B01J 35/04*  (2006.01)
  *F01N 3/20*  (2006.01)

(52) U.S. Cl.
  CPC ............ *B01J 35/04* (2013.01); *F01N 3/2066* (2013.01); *F01N 3/2828* (2013.01); *B01D 2046/2481* (2013.01); *B01D 2046/2485* (2013.01); *F01N 2330/34* (2013.01)

(56) References Cited

U.S. PATENT DOCUMENTS

| | | | |
|---|---|---|---|
| 5,714,228 | A | 2/1998 | Beckmeyer et al. |
| 5,866,080 | A | 2/1999 | Day |
| 6,258,436 | B1 | 7/2001 | Pajonk et al. |
| 2007/0227109 | A1 | 10/2007 | Hong et al. |
| 2007/0231533 | A1 | 10/2007 | Aniolek et al. |
| 2010/0062213 | A1 | 3/2010 | Kondo |
| 2011/0052454 | A1 | 3/2011 | Kato |

FOREIGN PATENT DOCUMENTS

| | | |
|---|---|---|
| DE | 20 2004 013 009 | 2/2006 |
| EP | 0 824 183 | 2/1998 |
| EP | 1 787 705 | 5/2007 |
| EP | 2 500 079 | 9/2012 |
| FR | 2 946 892 | 12/2010 |
| JP | 8-193512 | 7/1996 |
| JP | 2012-514157 | 6/2012 |
| KR | 10-2007-0038021 | 4/2007 |
| WO | 2005/115589 | 12/2005 |
| WO | 2010/075345 | 7/2010 |
| WO | 2010/149908 | 12/2010 |
| WO | 2012/135387 | 10/2012 |
| WO | 2013/111728 | 8/2013 |

OTHER PUBLICATIONS

International Search Report and Written Opinion of the International Searching Authority dated Dec. 18, 2015 in International Application No. PCT/EP2015/066734.
International Preliminary Report on Patentability dated Nov. 11, 2016 in International Application No. PCT/EP2015/066734.
Tomasic et al., "State-of-the-art in the monolithic catalysts/reactors", Applied Catalysis A: General, vol. 311, Jul. 2006, pp. 112-121.
European Patent Office communication dated Feb. 15, 2018 in European Patent No. 14 701 725.5.
Nam et al., "Modeling of Monolith Reactor Washcoated with CuZSM5 Catalyst for Removing NO from Diesel Engine by Urea.", Ind. Eng. Chem. Res. 2006, pp. 5258-5267, http://pubs.acs.org/doi/pclf/10.1021/ie060199%2B.
Preliminary Notice of Reasons in Rejection dated Jul. 5, 2016 in Japanese patent application No. 2015-554154.
International Search Report dated Apr. 4, 2014 in International Application No. PCT/EP2014/051382.
Written Opinion of the International Searching Authority dated Apr. 4, 2014 in International Application No. PCT/EP2014/051382.
Jim Kindinger, "Lightweight structural cores", In: "Composites", Dec. 1, 2001, ASM International, USA, XP055089000, ISBN: 978-0-87-170703-1, pp. 180-183.
Ju J et al., "Compliant hexagonal periodic lattice structures having both high shear strength and high shear strain", Materials and Design, London, GB, vol. 32, No. 2, Feb. 1, 2011, pp. 512-524, XP027431449.

HONEYCOMB MONOLITH STRUCTURE

FIELD OF INVENTION

The invention concerns a honeycomb monolith structure, especially for use as catalyst or support for a catalyst in selective catalytic reduction (SCR) of nitrogen oxides.

The invention furthermore relates to a stacked structured reactor comprising multiple honeycomb monolith structures stacked along their common flow direction.

BACKGROUND OF THE INVENTION

Honeycomb monolith structures comprise a plurality of cell walls defining a plurality of channels, or elongated cells, separated from each other by said cell walls, wherein the plurality of cell walls and channels extend in parallel along a common direction from an entrance end to an outlet end of the structure in the fluid flow direction. The channels are open in both ends. Monolith structures are usually given a complementary shape and placed side by side with their channels aligned along the flow direction in a reactor, completely covering the cross-sectional area of the reactor, with the consequence that the gas flowing through the reactor is made to pass entirely through the channels of the monolith structures.

Honeycomb catalyst monoliths are utilised either by producing the whole monolith structure from a catalytic material, or by coating the surface of a monolith structure with a catalytically active material wherein the internal monolith structure walls contain an inert carrier material. Such monolith reactors are produced in a range of materials, typically different types of metals, ceramics or composites, wherein several production methods are known in the art. Common examples of production routes are extrusion and moulding.

Such monolith reactors can be produced with a large span in pitches and wall thickness, depending on demands on surface area, conversion, pressure drop, plugging resistance etc., as well as considerations involving monolith material strength and production limitations.

Among the advantages of monolith reactors are a low pressure drop, a relatively high surface area, reasonable production costs, and the fact that they can be utilised in processes with gas mixtures containing particulate material (dust, fly ash, soot etc.), such as effluent gases from incinerators.

The current invention concerns a novel honeycomb monolith structure having a novel honeycomb monolith channel design, especially for use in NOx-removal from exhaust/flue gases wherein the flue gas often contains particulate matter with varying particle size. Nitrogen oxides may be catalytically reduced to elementary nitrogen and water by the use of specific types of ceramic or metallic catalysts (called selective catalytic reduction, SCR). The ceramic catalysts can be extruded into a monolith structure. For the NOx removal reactions, the mass-transfer to the monolith surface is the rate-limiting step.

Common SCR catalysts are manufactured from various ceramic materials used as a carrier, such as titanium oxide, and the active catalytic components are usually either oxides of base metals, such as vanadium and tungsten, zeolites and various precious metals. Each catalyst component has advantages and disadvantages. Titanium oxide-based ceramic honeycomb SCR catalysts are often used for power generation, petrochemical and industrial processing industries.

Honeycomb monolith structures are available wherein the transversal cross section of the channels have different shapes. Such a transversal cross section is also called a cell. The most common commercially available monolith structures are honeycombs with channels having a square transverse cross section, as for example shown in International patent application WO 2012/135387 A1 (Cormetech, Inc., 2012). Also, catalytic converters with channels having a rectangular transverse cross section are known. Such a rectangular shape is, for example, disclosed in U.S. Pat. No. 5,866,080 (Day, 1999) disclosing a rectangular transverse cross section with a width/height ratio of at least 1.2, preferably in the range of 1.5 to 2.5, and in U.S. Pat. No. 6,258,436 (Siemens AG, 2001), disclosing a rectangular transverse cross section with a width:height ratio of 2:1.

Structures with hexagonal cells are also known. Chinese utility model CN201815314 relates to a honeycomb catalyst, provided with a regular hexagonal internal pore passage structure and used for SCR denitration technology. The regular hexagonal internal pore passage combines the advantages of a square internal pore passage and a circular internal pore passage. The plurality of flue gas flow internal pore passages distributed in honeycombed shapes are arranged in a square or hexagonal catalyst skeleton, and the transverse cross section of each internal pore passage is regular hexagonal, having a width:height ratio of about 1:1.

A disadvantage with the channels in prior art monolith structures is the high density of corners (corners per $cm^2$) and/or the fact that a majority of the corners are straight corners, i.e. corners wherein two adjacent walls meet at an angle of 90 degrees. One example is the ubiquitous square channel/cell geometry.

One of the challenges with the prior art is that the corners, especially corners of 90 degrees or smaller angles, have undesirable properties, such as a low chemical conversion, a higher pressure drop and are prone to plugging and fouling with particulate material in the gas stream, with subsequent and accompanying erosion problems.

Published patent documents also exist on smoothing walls and corners in monolith structures in order to obtain a structure with an increased structural strength, as is, for example, described in US patent application 2010/0062213 A1 (Denso Corporation, 2010), which discloses an hexagonal honeycomb structure with slightly curved walls and smoothed angles between two adjacent walls, and in U.S. Pat. No. 5,714,228 (General Motors Corporation, 1999) which discloses a hexagonal shape with rounded corners.

From International patent application PCT/EP2014/051382 it is known novel monolith designs for use in mass transfer limited processes having elongated polygonal channels. Preferably the transversal cross section of the channels is hexagonal, pentagonal or octagonal. The inside corners of the channels can be rounded and all or the main part of the channels should have the same flow resistance.

As seen from this small discussion on some prior art monoliths, there are a multitude of channel configurations that have been disclosed in the prior art. Nevertheless, the ubiquitous square channels still predominates in commercial practice. In addition, most of the prior art discussed above involve automotive applications that have relatively clean exhaust emissions where plugging and fouling with particulate material in the gas stream is not a significant problem. There continues to be a need to improve channel configurations, particularly where flue gasses contain particulate matter such that the channels can become blocked over time.

SUMMARY OF THE INVENTION

One of the preferable monolith designs as disclosed in PCT/EP2014/051382 is monoliths where the main part of the channels are elongated hexagons and/or pentagons, preferably with rounded corners. When these are arranged in a closest packing within a catalyst block with square or rectangular cross section, some of the cells around the monolith edges will have half the transverse cross-sectional area of the majority of the cells. In these cells the gas flow will be low, making them contribute less to the chemical conversion.

These edge regions are also possibly more prone to clogging by particles entrained in the gas to be purified. It has also been observed that clogging spreads from initially clogged cells.

Hence, the main objective of the present invention is to provide a honeycomb monolith structure with superior resistance to dust clogging and attrition, as well as having good chemical conversion rates also at the edge regions.

These and other objectives of the invention are obtained with the honeycomb structure (also referred to as monolith structure or honeycomb monolith structure) as described below.

The invention thus concerns a honeycomb monolith structure, especially for use as catalyst or support for a catalyst in selective catalytic reduction (SCR) of nitrogen oxides, comprising:

a plurality of cell walls defining a plurality of polygonal channels, the plurality of cell walls and channels extending in parallel along a common direction from an entrance end to an outlet end of the structure in the fluid flow direction and where the channels are open in both ends. The transversal cross section of a polygonal channel has the shape of elongated convex polygons in a closest packing. More than 50% of the internal angles between two adjacent walls of the convex polygon are greater than 90 degrees and the cell aspect ratio $L_L/L_S$ is greater than 1.5. The monolith structure has a plurality of cells with an elongated polygonal cross section oriented in a perpendicular direction to the majority of cells of polygonal cross section in an edge region adjacent to the two edges of the monolith which are parallel to the longest cross sectional direction $L_L$ of the majority of cells/channels.

In a preferred embodiment, the majority of elongated polygons in closest packing are hexagons and/or pentagons.

The plurality of elongated polygons in the edge region of the monolith, which is oriented in a perpendicular direction to the length $L_L$ of the majority of the polygons, alternate with a number of elongated polygons oriented in parallel direction to the length $L_L$ of the majority of polygons.

The elongated perpendicular polygons have a rectangular or octagonal shape and it is preferred that at least some of the elongated polygons oriented parallel to the length $L_L$ of the majority of polygons also have a rectangular or octagonal shape.

In a preferred embodiment the elongated convex polygons in the closest packing are hexagons and/or pentagons with rounded inner corners.

The honeycomb structure is further defined by the claims.

BRIEF DESCRIPTION OF THE FIGURES

The honeycomb monolith structure according to the invention will be further described with reference to the accompanying drawings, FIGS. 1-6, wherein:

FIG. 3B shows a pentagonal channel geometry.

DETAILED DESCRIPTION OF THE INVENTION

A disadvantage with the channels in prior art monolith structures is the high density of corners (corners per cm$^2$) and/or the fact that a majority of the corners are straight corners, i.e. corners wherein two adjacent walls meet at an angle of 90 degrees. One example is the ubiquitous square channel/cell geometry.

Corners, especially corners of 90 degrees or smaller angles, have undesirable properties, such as a low chemical conversion, a higher pressure drop and are prone to plugging and fouling with particulate material in the gas stream, with subsequent and accompanying erosion problems.

The honeycomb monolith structure according to the present invention has a transversal cross sectional shape which is the shape of a convex polygon, wherein more than 50% of the internal angles between two adjacent walls are above 90 degrees and wherein the cell aspect ratio $L_L/L_S$ is greater than 1.5. This definition includes pentagonal, hexagonal, heptagonal, octagonal, nonagonal, decagonal and polygonal structures with a higher number of angles.

Within the context of the present invention, a honeycomb monolith structure is defined as a structure comprising a plurality of channels, or cells, or passages, separated by thin walls, extending in parallel along a common direction from an entrance end to a outlet end of the structure in the direction of a fluid, such as a liquid or a gas, flowing through said plurality of channels, or cells, or passages (longitudinal axis/fluid flow direction).

Within the context of the present invention, a convex polygon is defined as a polygon wherein all internal angles between two adjacent walls are in the range from 90° to 180°, this in contrast to a concave polygon, wherein one or more of the internal angles between two adjacent walls are below 90°.

Within the context of the present invention, the cell aspect ratio $L_L/L_S$ is defined as the ratio of the longest internal diameter ($L_L$) over the smallest internal diameter ($L_S$) of a cell, wherein both diameters are measured perpendicular to the common direction from an entrance end to an outlet end of the structure in the flow direction of a fluid, wherein both diameters are measured as the length of a straight line through the centre of gravity of the cell with a start- and endpoint at a wall delimiting the cell, and wherein both diameters are orthogonal to one another.

Within the context of the present invention the pitch of the polygon in the long direction, $P_L$, is defined as channel opening length $L_L$ plus wall thickness C' parallel to the long direction of the cell cross section. The pitch in the short direction, $P_S$, is defined as the channel opening width $L_S$ plus wall thickness C.

It is preferred that all the channels in the honeycomb monolith structure should have about the same transversal cross-sectional shape and dimensions. Although it is also preferred that all the walls have the same thickness, it is not mandatory for the invention, and it is recognized that there may be structural benefits when some of the walls in the monolith are thicker (increasing mechanically strength).

The invention will be further described with reference to the drawings.

Figure 1:
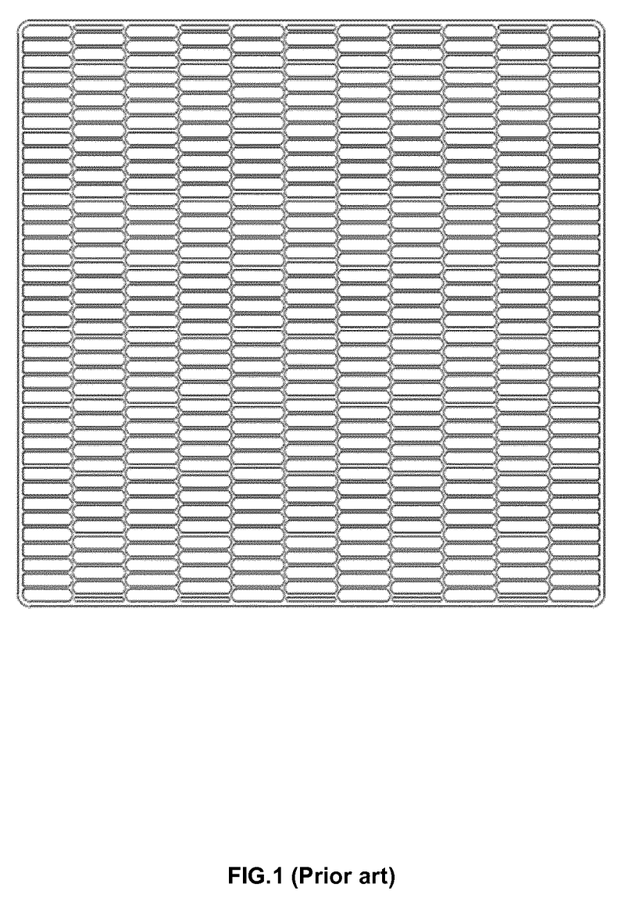
FIG. 1 shows a honeycomb monolith where the main part of the cross section has elongated hexagonal channel geometry and with half cells along two of the monolith edges as disclosed in PCT/EP2014/051382.

In FIG. 1 is shown an entrance end (or outlet end) of a honeycomb monolith structure according to prior art as disclosed in PCT/EP2014/051382. These structures are produced in blocks with mainly a square cross section (or a rectangle) where the main part of the channels have an elongated hexagonal cell cross section that can have rounded inside corners. At two of the outer edges of the monolith elongated pentagonal cells are arranged with the straight end to the edge of the monolith structure. The polygons are shown in a closest packing. Using a closest packing arrangement, the open frontal area (OFA) is maximized.

By selecting an elongated shape for the channel cross-section, it is possible to decrease the pressure drop significantly, while still maintaining or even improving the chemical conversion rate. However, such an arrangement has the disadvantage that there will be narrow half cells along two of the edges, as shown in FIG. 1. In these cells the gas flow will be low, making them contribute less to the chemical conversion.

These edge regions are also more prone to clogging by particles entrained in the gas to be purified. It has also been observed that clogging spreads from initially clogged cells.

In order to maintain the preferable design of the catalyst structure as shown in FIG. 1 and at the same time obtain an improved conversion and less clogging of material also at the edges, an improved cell structure is proposed.

Figure 2:
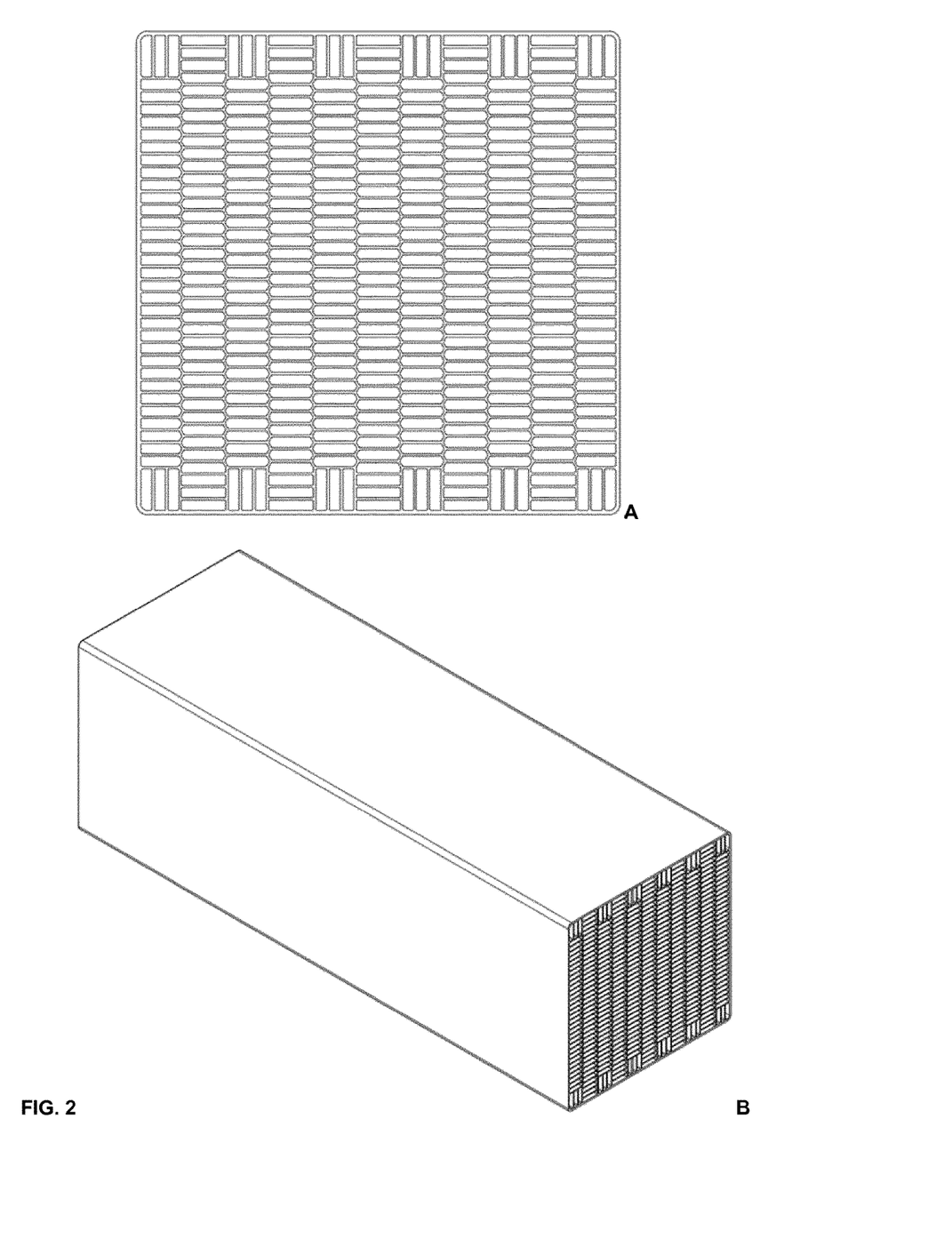
FIG. 2A shows a cross section of a honeycomb monolith with shifted cells perpendicular to each other along the monolith edges according to the invention.
FIG. 2B shows a honeycomb monolith block according to the invention.
Figure 3A:
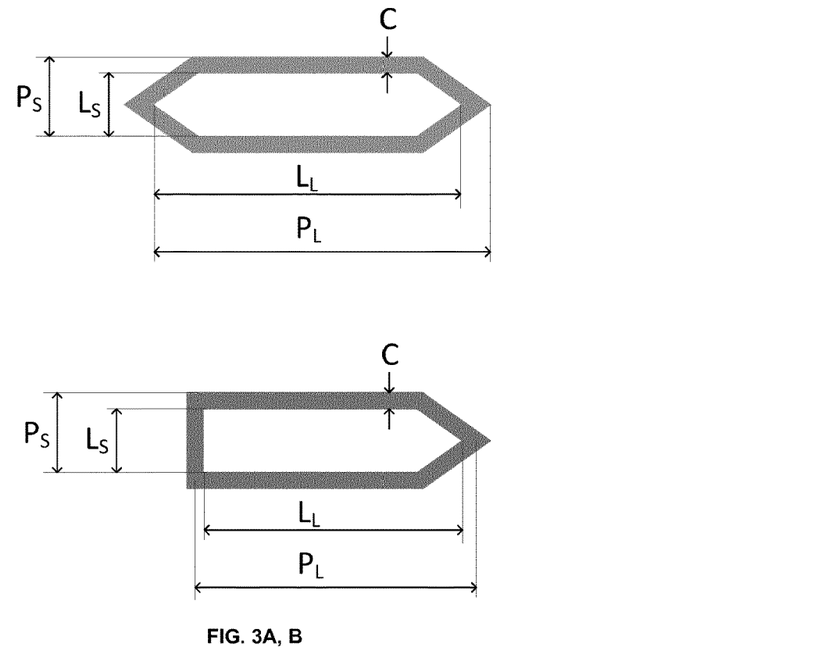
FIG. 3A shows a channel geometry as an elongated hexagon.
Figure 3C:
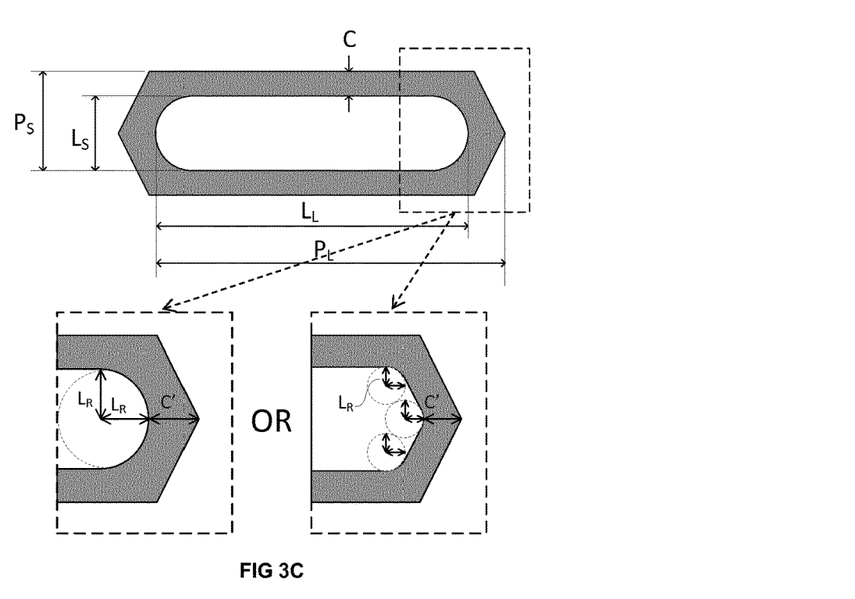
FIG. 3C shows a channel geometry as an elongated hexagon with rounded corners.

FIGS. 2A and B show a monolith structure according to the invention. The main part of the channels have an elongated hexagonal cell cross section as shown in FIG. 3A with pentagonal channels as shown in FIG. 3B towards two opposite edges of the structure. The cells are shown in a closest packing. The basic cells have Ls=3.2 mm and cell aspect ratio $L_L/L_S$=3.5. The inner corners of the cells can be rounded as illustrated in FIG. 3C.

Adjacent to the two outer edges of the structure that are parallel with the longest direction of the cells, the monolith structure has alternating elongated convex polygons in direction perpendicular to the hexagonal/pentagonal cells in closest packing and parallel with them. All with rounded corners. In the figure it is shown three elongated polygons in perpendicular direction alternating with three polygons in parallel with the majority of cells along the outer edge of the monolith.

Cells oriented perpendicular to the majority of elongated hexagons have a pitch (channel width plus wall thickness) in their longest dimension of (n+½) times the pitch in the short direction of the cells, and a shortest dimension equal to the short dimension of the elongated hexagons L. The parameter n is 2, 3, 4 or 5, most preferably 3 or 4.

Blocks of n such cells alternate with blocks of n+1 cells arranged with their longest dimension parallel to the orientation of the majority of cells. The length of these cells is equal to the pitch in the long direction of the majority of cells. In each block, the n cells closest to the outside walls have an essentially octagonal or rounded rectangular shape. The fourth cell can be considered to consist of merging half of one of the majority elongated hexagons with half of a cell like the adjacent edge cell. It is a six-sided polygon with two 90° angles.

In the figure the shape of the cells oriented perpendicular to the majority of the flow channels is shown essentially octagonal or rectangular with rounded corners. However, elongated polygons with even more corners can be used.

In the monolith as disclosed in the figure all the cells have a uniform cell size. All the cells in the design have hydraulic diameter within 4% of the basic hexagonal cell, and should thus have the potential to achieve similar gas flow rates.

The limitations on the longest diameter ($L_L$), substantially equal to the length of the cell, chosen for a given wall thickness, will in general be defined by the required material strength and structural properties of the monolith structure, i.e. dependent on the material chosen for the monolith structure walls. The limitation on the smallest diameter ($L_S$), substantially equal to the height of the cell, will in general be linked to the size of any particulate material in the gas flow.

According to one embodiment the wall thickness C ranges between 0.1 and 1.5 mm, preferably between 0.2 and 1.0, including the boundary values.

According to one embodiment the length $L_S$ of the majority of the polygons in the short transverse direction ranges between 1 and 10 mm, preferably between 2 and 6 mm, including the boundary values.

According to one embodiment the length $L_L$ of the majority of polygons in the long transverse direction ranges between 2 and 60 mm, most preferably between 5 and 40 mm, including the boundary values.

According to one embodiment, the longitudinal polygons may also have one or more rounded internal corners. When an internal corner in the cross-section of the polygon is rounded, the radius of curvature ($L_R$) of the rounded corner is half or less than the smallest diameter ($L_S$), i.e. $L_R \leq L_S$, as has been shown in FIG. 3c for two radii of curvature, in the left pane where $L_R$ is about half of $L_S$, and in the right pane where $L_R$ is much smaller than $L_S$. Preferably, all internal corners are rounded.

The honeycomb structure according to the invention can be produced using any suitable means known to the skilled person. In particular, a method of producing the honeycomb structure according to the invention comprises at least an extrusion moulding step, a cutting step, a drying step, and a firing step. In particular, the extrusion moulding step uses an extrusion moulding die having a plurality of slit grooves which are arranged corresponding to the shape of the arrangement of the cell walls in the polygonal cell honeycomb structure according to the invention.

In an extrusion step moulding step, at first, a ceramic raw material powder is prepared having the desired composition. Next, water, ceramics binder and other additives of a predetermined amount are added to the ceramic material, and subsequently mixed together in order to make the ceramic paste. This ceramic paste is extruded using the moulding die to produce the polygonal cell honeycomb structure according to the invention.

In the cutting step, the shaped body having a honeycomb structure is cut into a plurality of parts of a predetermined length.

In the firing step, the dried honeycomb structure parts are fired at a predetermined temperature, for example at 1400° C. for a ceramic material. After completion of the firing step, the polygonal honeycomb structure of the invention is produced, as shown in FIG. 2.

Alternatively, the structure can also be made by additive layer manufacturing, such as disclosed in WO 2012/032325 (Johnson Matthey PLC, 2012).

According to one embodiment, multiple monolith structures can be stacked along their common flow direction forming a structured reactor.

EXAMPLES

Example 1

Fly-Ash Resistance

Experiments were carried out to demonstrate the dust fouling and attrition properties related to different geometry of the monolith. Comparative studies were carried out on monoliths produced in the same material and with the same production method where one had the square channel structure, one had the structure disclosed in WO2014114739 with elongated hexagonal channel geometry ($L_L/L_S$=4), shown in FIG. 1, and the third had a structure of an embodiment of the present invention, shown in FIG. 2.

The experiments related to fouling and attrition were performed on equipment where air containing solid fly-ash particles at a relevant range of superficial velocities (usually around 5 m/s in front of the sample) were entered from the top through a monolith sample standing vertically. The solid concentration is relevant for high dust applications in coal-power plants, i.e. from 10 g/Nm³-30 g/Nm³. The solid particles used in the experiments are fly-ash captured by electrostatic precipitators in coal-power plants, fly-ash that is commonly added to Portland cement.

The experimental set-up consists of a fan that blows dry air (dew point at 4° C.) through an electrical heater, a screw feeder of fly-ash to an eductor where the amount fed is monitored by a weight cell, and a gas cyclone after the monolith sample holder. The holder containing the monolith sample has straight walls with the necessary length to achieve a fully developed flow as has been verified by CFD simulations. The pressure drop was measured over the sample holder and the exposed monolith was monitored by weight measurements and by regular taken photographs. Image analysis was used to monitor parameters like the open frontal area of the different monoliths or simply the number of channels that are plugged.

Figure 5:
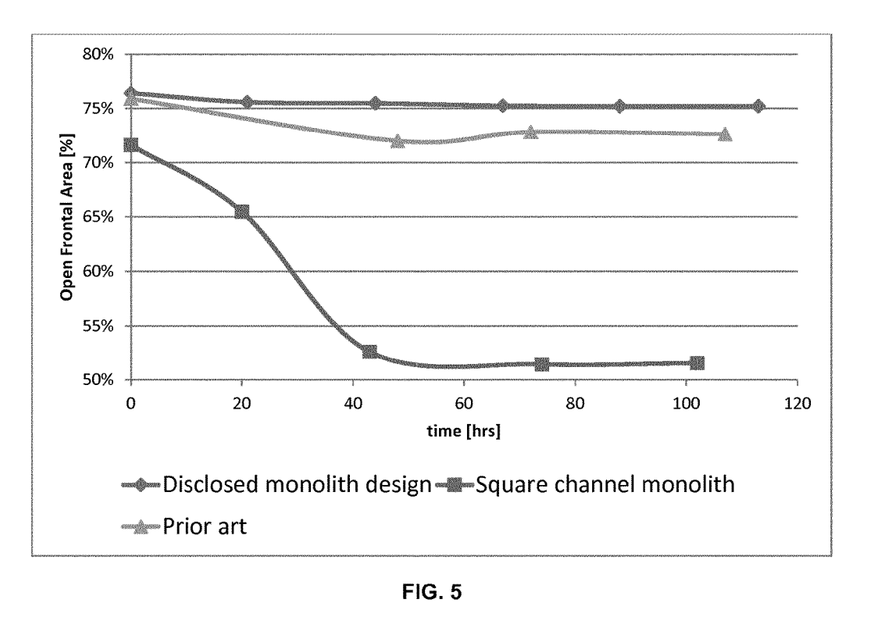
FIG. 5 shows the open frontal area is shown as a function of time for three different monoliths, namely one of the invention as in FIG. 2, the prior art as in FIG. 1 and the prior art comprising square channels.
Figure 6:
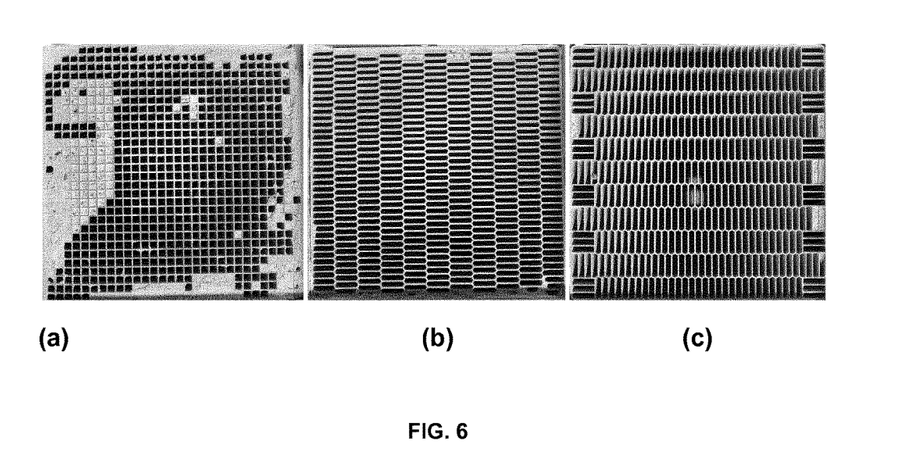
FIG. 6A shows the the result after more than 100 hours of accelerated plugging tests for the prior art square channel monolith.
FIG. 6B shows the result after more than 100 hours of accelerated plugging tests for prior art as in FIG. 1
FIG. 6C shows the result after more than 100 hours of accelerated plugging tests for an embodiment of the invention as disclosed in FIG. 2.

Post-analysis of the monoliths measure the depth of plugs and the amount of fouling on the monolith surfaces. The results are shown in FIG. 5, where the open frontal area is shown as a function of time. The open frontal area is higher with the new design and it is found lower plugging than for prior art (defined as a channel structure as disclosed in WO2014114739) and for the square channel monolith. The pictures in FIG. 6 show the result after more than 100 hours of accelerated plugging tests for the square channel monolith (a), prior art (b), and the disclosed design of the present invention (c).

Comparing an embodiment of the invention (c), FIG. 2 with the prior art (b), FIG. 1, it can be seen that in addition to eliminating flow channels of a smaller cross section, the present invention also increases the overall Open Frontal Area (OFA) and saves catalyst material. The structures shown in FIGS. 1 and 2 both feature the same basic flow channel geometry, with a cell diameter ratio ($L_L/L_S$)=4. The novel arrangement of flow channels in the edge regions led to an increase in the OFA from 75.96% to 76.41%. Without being bound by theory, the increase in OFA reduces the frontal area hit by dust particle for high-dust flue gas, reducing the risk for dust deposition and fouling. The required catalyst material can also be correspondingly reduced by 1%, leading to reduction of material cost.

Example 2

Pressure Drop

For the measurement of pressure drop through the monoliths, the monolith sample was installed in a pressure drop test system. The system consisted of three parts: fan, controller and pressure indicator. The fan was employed to gain a range of air flow rate which lead to a range of superficial velocity in front of a monolith sample. In a typical test, a monolith sample was tested for pressure drop in the range of 0 to 10 m/s in the duct which generally has the size of 15 cm by 15 cm but can be varied in terms of its monolith size to be tested. The monolith sample was placed in the measuring duct which was straight enough to achieve a fully developed flow. The controller was adjusted to achieve a predetermined gas superficial velocity of 5 m/s at 25° C. In order to confirm the gas superficial velocity, a velocity meter probe was inserted in the sampling hole located before the monolith sample. A static pressure probe was also used in the same sampling hole to measure its upstream static pressure. Downstream static pressure can be measured through another sampling hole located after the monolith sample. The differential pressure can be decided by these two static pressures.

Monoliths of the improved (FIG. 2) and prior art (FIG. 1) catalyst shapes, as well as a conventional square-channel monolith with the same catalytic activity were produced from the same material with the same outer dimensions (150×150×450 mm). The results are shown below:

| Sample | Δp (@5 m/s/1 bar/25° C.) [mbar] |
| --- | --- |
| Square channel monolith (with same DeNOx activity) | 120 |
| Prior art monolith design (FIG. 1) | 89 |
| Disclosed monolith design (FIG. 2) | 88 |

The pressure drop of the disclosed design is considerably lower than the conventional square channel monolith, and slightly lower than the prior art monolith.

Example 3 (Comparative)

NOx Conversion of Conventional (Square Channel Monolith) Compared with elongated Hexagonal Channel Monolith The DeNOx activity was measured in a pilot scale experimental facility with up to three samples, ¼ of the typical commercial cross section, i.e., about 75×75 mm. Each monolith sample was up to 150 mm long. In the pilot plant gas composition, gas flow, ammonia injection and sample temperature were controlled. The composition of the gas at the inlet and outlet of the reactor was measured using a high resolution mid IR analyzer.

The NOx conversion of the sample is expressed as:

$$X_{NOx} = \frac{(C_{NO} + C_{NO_2})\text{outlet}}{(C_{NO} + C_{NO_2})\text{inlet}}$$

The NOx conversion was measured using a simulated flue gas containing 1200 ppm NO and 300 ppm $NO_2$ at temperature 350° C. and a superficial velocity of 4.6 m/s. An ammonia feed of 1500 ppm was added to the simulated flue gas. Three samples each (67×67×150 mm) of the square channel design and an elongated hexagonal design similar to the one shown in FIG. 1 were installed in parallel reactors in the pilot scale experimental facility. Both geometries were produced from the same material. From CFD simulations, the two samples were expected to give the same NOx conversion. The DeNOx results are shown below. The NOx conversion was the same when comparing the two samples.

| Sample | $X_{NOx}$ [%] |
| --- | --- |
| Square channel monolith | 83 |
| Prior art monolith design (FIG. 1) | 83 |

Example 4

Figure 4:
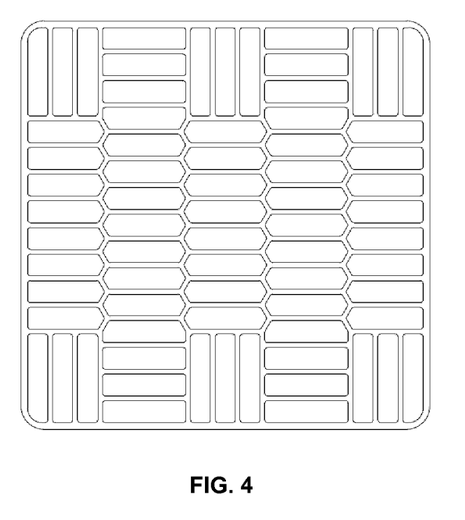
FIG. 4 shows an embodiment of the invention wherein the outside dimensions of the honeycomb monolith are 67×67× 150 mm.

NOx Conversion of Conventional (Square Channel Monolith) Compared with the Disclosed Monolith Design The DeNOx activity was measured in the experimental facility of Example 4 using three samples each of the square channel design and a smaller version of the disclosed design, shown in FIG. 4. The samples of both geometries were produced from the same material and had similar outer dimensions of 67×67×150 mm.

The NOx conversion was measured using a simulated flue gas containing 820 ppm NO and 240 ppm $NO_2$ at 350° C. and a superficial velocity of 7 m/s. An ammonia feed of 1060 ppm was added to the simulated flue gas. The DeNOx results are shown below. The NOx conversion was the same for the two monolith designs, while the novel disclosed monolith design representing an embodiment of the present invention had a lower pressure drop as shown in Example 2.

| Sample | $X_{NOx}$ [%] |
| --- | --- |
| Square channel monolith | 68 |
| Disclosed monolith design (FIG. 2) | 68 |

The invention claimed is:

1. A honeycomb monolith structure, especially for use as a catalyst or support for a catalyst in selective catalytic reduction (SCR) of nitrogen oxides, comprising:
   a plurality of cell walls defining a plurality of polygonal channels, the plurality of cell walls and channels extending in parallel along a common direction from an entrance end to an outlet end of the monolith structure in a fluid flow direction,
   wherein the polygonal channels are open in both ends,
   wherein a transversal cross section of a majority of the polygonal channels have an elongated convex polygon shape in a closest packing, wherein more than 50% of the internal angles between two adjacent walls of the convex polygon are greater than 90 degrees and wherein a cell aspect ratio $L_L/L_s$ is greater than 1.5,
   wherein the monolith structure has two edges which are parallel to the longest cross sectional direction ($L_L$) of the majority of polygonal channels,
   wherein the monolith structure has a plurality of polygonal channels with an elongated polygonal cross section oriented in a perpendicular direction to the majority of channels of polygonal cross section, and
   wherein the polygonal channels oriented in the perpendicular direction are arranged in an edge region adjacent to the two edges of the monolith which are parallel to the longest cross sectional direction ($L_L$) of the majority of polygonal channels.

2. The honeycomb monolith structure according to claim 1, wherein the majority of elongated convex polygon shapes in the closest packing are hexagons and/or pentagons.

3. The honeycomb monolith structure according to claim 1, wherein the plurality of elongated polygons in the edge region of the monolith which is oriented in a perpendicular direction to the length $L_L$ of the majority of the polygons, alternate with a number of elongated polygons oriented in a parallel direction to the length $L_L$ of the majority of polygons.

4. The honeycomb monolith structure according to claim 1, wherein the elongated perpendicular polygons have a ratio of a pitch (channel opening length plus wall thickness) in their long direction to a pitch of the majority of elongated polygons in the short direction equal to n+½, with n being an integer in the range 2-5.

5. The honeycomb monolith structure according to claim 4, wherein the elongated perpendicular polygons have the pitch in the long direction equal to 3.5 or 4.5 times the pitch of the majority of elongated polygons in the short direction.

6. The honeycomb monolith structure according to claim 3, wherein the elongated perpendicular polygons have a rectangular or octagonal shape.

7. The honeycomb monolith structure according to claim 3, wherein at least some of the elongated polygons oriented parallel to the length $L_L$ of the majority of polygons have a rectangular or octagonal shape.

8. The honeycomb monolith structure according to claim 1, wherein the cell walls have a wall thickness (C) between 0.1 and 1.5 mm, including the boundary values.

9. The honeycomb monolith structure according to claim 1, wherein the length ($L_S$) of the majority of polygons in the short transverse direction ranges between 1 and 10 mm, including the boundary values.

10. The honeycomb monolith structure according to claim 1, wherein the length ($L_L$) of the majority of polygons in the long transverse direction ranges between 2 and 60 mm, including the boundary values.

11. The honeycomb monolith structure according to claim 1, wherein the inside corners of the polygons are rounded.

12. The honeycomb monolith structure according claim 1, made by extrusion of a ceramic material.

13. The honeycomb monolith structure according to claim 1 wherein the structure is for use in NOx-removal from exhaust or flue gases wherein the gas contains particulate matter with varying particulate size.

14. A stacked structured reactor comprising multiple honeycomb monolith structures according to claim 1 stacked along their common flow direction.

15. The honeycomb monolith structure according to claim 8, wherein the wall thickness (C) ranges between 0.2 and 1.1 mm, including the boundary values.

16. The honeycomb monolith structure according to claim 9, wherein the length ($L_S$) of the majority of polygons in the short transverse direction ranges between 2 and 6 mm, including the boundary values.

17. The honeycomb monolith structure according to claim 10, wherein the length ($L_L$) of the majority of polygons in the long transverse direction ranges between 5 and 40 mm, including the boundary values.

18. The honeycomb monolith structure according claim 12, wherein the ceramic material is a ceramic paste.

\* \* \* \* \*